UNITED STATES PATENT OFFICE 2,434,094

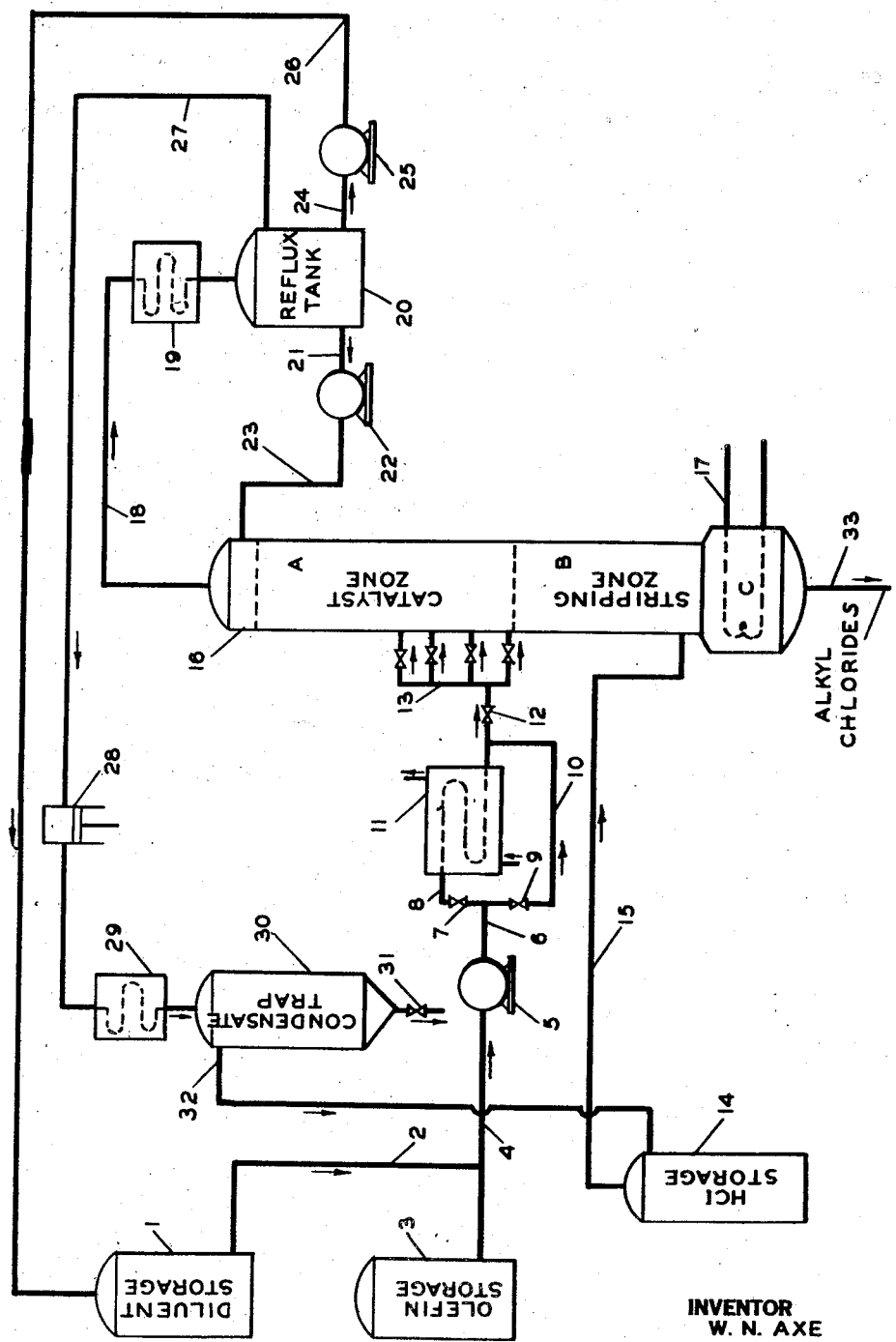

HYDROCHLORINATION OF OLEFINS

William Nelson Axe, Bartlesville, Okla., assignor to Phillips Petroleum Company, a corporation of Delaware Application September 8, 1944, Serial No. 553,241

7 Claims. (Cl. 260—663)

In one aspect, this invention relates to a novel process for the hydrochlorination of olefinic hydrocarbons to produce alkyl chlorides. In another aspect, it is concerned with a novel arrangement of equipment for carrying out such a reaction. Still more particularly it relates to the provision of a method and means by which advantage is taken of countercurrent principles in effecting the interaction of aliphatic olefins and hydrogen chloride in contact catalytic systems.

Alkyl chlorides represent a valuable group of organic intermediates that have long found application in the classical Wurtz-Fittig, Friedel-Crafts and Grignard reactions. More recently alkyl chlorides have attained increasing importance as primary intermediates in the production of alcohols, amines, mercaptans and the like as a result of the abundant production of olefinic hydrocarbons in the petroleum industry. The displacement of expensive alcohols by olefinic hydrocarbons in hydrochlorination reactions has made possible large scale production of alkyl chlorides at economically attractive production costs with respect to raw materials consumed. More recently attention has been directed toward the development of more efficient and economical processing operations. Heretofore the hydrochlorination of olefins has been accomplished in conventional equipment involving catalytic reactors, fractionating equipment and the like arranged in series such that the chemical reaction, recovery of excess HCl, recovery of diluent and fractionation of the product are carried out in separate process units. Thus, while some variations in the means of effecting the hydrochlorination itself have been described, relatively little improvement in subsequent process steps has been disclosed.

The principal object of the present invention is to provide an improved method and apparatus for effecting the hydrochlorination of olefins to produce alkyl chlorides.

It is an object of this invention to provide a process for the hydrochlorination of olefins utilizing countercurrent principles.

A further object of the present invention is to effect the hydrochlorination of olefinic hydrocarbons over a solid contact catalyst under conditions such that hydrochlorination and primary segregation of alkyl chlorides are realized in the reaction unit.

A still further object is to provide a novel hydrochlorination reaction unit wherein a countercurrent flow of gaseous reactants and liquid product is maintained.

Additional objects and advantages of the present invention will be apparent in the light of the subsequent disclosure.

I have found that hydrochlorination of olefinic hydrocarbons is efficiently and expeditiously carried out in a column-type reactor embodying a stripping column and a catalyst case. The novel reactor preferably includes a reboiler surmounted by a stripping section which is in turn surmounted by a catalyst section filled with an adsorbent catalyst of coarse mesh. The olefin feed, preferably diluted with a selected inert hydrocarbon described more fully below is injected into the catalyst section where it contacts anhydrous HCl ascending the column from its point of introduction in the stripping section. Temperatures in the catalyst section are so controlled that the resultant alkyl halides remain in the liquid state and flow down the column while hydrocarbon vapors and HCl flow upwards against a stream of inert reflux liquid employed for temperature control. The physically dissolved hydrocarbon and HCl are removed from the product stream in the stripping section and substantially uncontaminated alkyl halides are continuously withdrawn from the bottom of the column. Exit vapors at the top of the column comprise unreacted HCl and hydrocarbon vapor.

In accordance with my invention, aliphatic olefins are hydrochlorinated to make alkyl chlorides by a process which comprises continuously feeding hydrogen chloride into a vertical stripping zone, preferably equipped with fractionating plates or other inert means for effecting countercurrent contacting of vapor and liquid in the manner of fractional distillation, continuously feeding a mixture of the olefin and an inert condensible diluent into a vertical reaction zone superimposed on and in free fluid communication with the stripping zone and provided with a solid hydrochlorination catalyst. Preferably the olefin-diluent mixture is injected into the reaction zone at a plurality of vertically spaced points therein. Desirably the injection is into the lower half of the reaction zone. A molar excess of hydrogen chloride over the olefin is maintained at all times throughout the reaction and stripping zones. Conditions are so maintained that the olefin is caused to react with the hydrogen chloride. Most of the reaction takes place in the reaction zone, any small balance occurring in the stripping zone as stripping takes place. Preferably and almost invariably substantially all of the olefin is caused to react so that no free olefin appears in either the bottoms or overhead product. A mixture of alkyl chloride, hydrogen chloride, any unreacted olefin and diluent descends from the reaction zone through the stripping zone and is fractionally distilled as it so descends in such manner so as to remove all olefin, hydrogen chloride and diluent. This is accomplished by the provision of a reboiling section at the bottom of stripping section and passing the conventional heating fluid therethrough. The hydrogen chloride is fed into the stripping section at a point well below the top thereof, and aids in the stripping action therein. From the reboiling section there is continuously withdrawn a product stream consisting essentially of product alkyl chloride. If any polymer or any other high-boiling materials should be formed by side reactions, they appear in this stream. In general, however, such an excess of HCl over olefin is maintained and other conditions are such that no polymerization takes place and the product is free from any appreciable amounts of olefin polymer or other heavy by-products.

Conditions in the reaction zone are such that fractional distillation takes place therein facilitated by the granular solid catalyst which functions as a packing material to give a packed column. A liquid phase and a vapor phase are always present in this section of the column and contact each other to give a rectifying action.

From the top of the reaction zone there is continuously withdrawn a vaporous overhead which in practice consists essentially of hydrogen chloride and diluent. Absence of other materials, especially unreacted olefin, from this overhead is attributable to the avoidance of side reactions and the maintenance of conditions such that all of the olefin is reacted with HCl in the body of the column before it can attain the top of the column.

This vaporous overhead is cooled to effect condensation of the diluent which is then passed in part as reflux to the top of the reaction column, the balance of the condensate being recycled as diluent to be injected into the catalyst zone with fresh olefin. From the reflux accumulator there is withdrawn a vaporous phase of hydrogen chloride which is recycled to the stripping zone after cooling and compression to remove hydrocarbons therefrom. The hydrogen chloride vapor phase invariably contains some hydrocarbon and the liquid hydrocarbon phase contains an appreciable amount of dissolved HCl but the separation obtained in the reflux accumulator is sufficiently good for the purpose at hand.

The reaction is conducted under anhydrous conditions which are maintained throughout the equipment. The olefin charge and diluent may be passed through a drier to effect removal of the last traces of moisture therefrom. Anhydrous hydrogen chloride is likewise employed. If desired, suitable drying means may be interposed in the lines which charge the diluent, olefin and the hydrogen chloride to the column.

The pressure at which the column is operated should be such that the diluent can be condensed to liquid phase at the operating pressure by means of ordinary cooling water in order to avoid expensive refrigeration requirements.

Preferably provision is made for individually adjusting the amounts of olefin and diluent fed into the several spaced points in the reaction zone in order to control to the desired extent conditions of concentration and to a lesser extent temperature conditions.

A specific embodiment of the present invention involves the manufacture of butyl chlorides from a fraction of normal butylenes employing a solid catalyst such as aluminum chloride adsorbed on a coarse granular carrier comprised of such materials as alumina, silica, bauxite, "Porocel," pumice and the like. Referring now to the accompanying simplified flow diagram, the reaction unit 16 is first described. The reactor is comprised of a cylindrical tower-like structure which is divided into three sections, namely: A, representing the catalyst zone; B, representing a combined fractionating and stripping zone; and C, a reboiler zone. Zone A is filled with a solid catalyst of sufficiently coarse mesh as to permit easy up-flow of vapors and down-flow of liquid. The catalyst is supported on a perforated plate or screen which separates the zone A from zone B. Zone B may be provided with a suitable inert packing material such as ceramicware, raschig rings or it may be equipped with conventional bubble-plates. The only limitation in design is that the zone shall function with reasonable efficiency in separating product chlorides from olefin and diluent and that said section must cooperate with the operation of the reaction zone A. Zone C is merely a conventional reboiler equipped with a steam coil 17. The entire column operates substantially after the manner of a fractionating column. Reaction between the butylene feed and HCl occurs in zone A with the formation of liquid alkyl chlorides which flow countercurrently with respect to HCl and hydrocarbon vapors. Reaction temperature is controlled to a large extent by a reflux of inert diluent. The butyl chlorides along with unreacted olefin and diluent flow downward into zone B where ascending HCl and hydrocarbon vapors strip the hydrocarbon components from the product chlorides. The kettle product from the reboiler is continuously withdrawn through line 33 as substantially pure butyl chloride while the overhead stream consists essentially of gaseous HCl and paraffinic hydrocarbon diluent.

One procedure for establishing operating conditions in tower 16 comprises the following sequence of steps: (1) charge the preferred diluent such as n-pentane to the column and establish fractionating conditions with liquid pentane in the reboiler and pentane vapor passing overhead with total reflux return; (2) introduce HCl from line 15 into the stripping zone B at a rate suitable for subsequent reaction purposes and establish substantial equilibrium between the input of line 15 and the output of line 27; (3) charge the predetermined olefin-pentane blend through manifold 13 into catalyst zone A in order to establish the downflow of liquid butyl chlorides. By gradually increasing the heat input of coil 17, the diluent, is eventually displaced from zone C, at which time the unit is in condition for continuous withdrawal of alkyl chloride product via line 33.

Assuming the operating conditions have been established in the reaction column and referring now to the flow diagram, the operation of the process may be described in more detail. The olefin feed stream is prepared by blending n-pentane diluent from tank 1 and line 2 with substantially undiluted normal butylenes from tank 3 and line 4. The volume ratio of diluent to olefin may vary with operating conditions, but for illustrative purposes it may be assumed that the two streams are blended in a 1:1 volume ratio. Olefin and diluent pentane are thoroughly commingled in pump 5 and passed therefrom into heat exchanger 11 via line 6, valve 7 and line 8 where the charge is preheated to a suitable temperature level which is determined by the temperature and pressure of the reaction zone. As an aid in precise temperature control of the reaction zone a portion or all of the feed may by-pass the heat exchanger by way of valve 9 and line 10. When desired, virtually any feed temperature may be maintained by appropriate manipulation of valves 7 and 9. The feed streams in lines 8 and 10 are recombined and discharged through pressure reducing valve 12 into manifold 13 from which the feed is injected into the reaction zone A of column 16 at a plurality of points. The heat of reaction liberated by the hydrochlorination reaction vaporizes the incoming feed and while the higher boiling liquid chlorides pass down the column, pentane and excess HCl pass overhead in the vapor state through line 18 and the pentane is condensed in 19 before flowing into reflux tank 20. A portion of the condensed diluent is returned to the top of the column through line 21, pump 22 and line 23 to control the reaction temperature and to scrub any higher boiling material from the exit vapors. Diluent pentane in excess of that required for reflux is continuously returned to storage by way of line 24, pump 25 and line 26.

Hydrogen chloride is continuously metered to the stripping zone B from tank 14 and line 15 at such a rate that the mol ratio of HCl to olefin is greater than 1:1 and usually is at least 2:1 ranging up to 3:1 though it may be even higher. The ascending HCl serves as a stripping gas in zone B, aiding in the return of diluent and unreacted olefin to reaction zone B. The excess HCl over that required for the hydrochlorination reaction leaves the column through line 18, condenser 19 and passes into reflux tank 20. The HCl being in the gaseous state is vented from tank 20 through line 27 which delivers it to compressor 28. After compression to suitable storage pressures of from 200 to 700 p. s. i., the gas is passed through cooler 29 into a condensate trap 30 where the last traces of hydrocarbon are removed via valve 31. The compressed HCl is then returned to storage tank 14 via line 32.

The successful operation of the present invention is not confined to any specific catalyst composition, but may comprise any solid adsorbent catalyst of sufficient activity to promote hydrochlorination of olefins at temperatures below the boiling point of the product alkyl chlorides. Representative catalysts may include the halides of aluminum, iron and zinc, especially aluminum chloride, supported on porous solid adsorbent carriers such as alumina, silica, bauxite and pumice. Such aluminum chloride catalysts are described in the following U. S. Patents: 2,277,512; 2,295,977; 2,311,713 and 2,313,053. An especially suitable carrier is the granular form of specially calcined bauxite known in the trade as "Porocel."

The present hydrochlorination process is applicable to the preparation of any alkyl chloride of sufficient stability to withstand fractional distillation at atmospheric or low superatmospheric pressures. Ordinarily it is preferred to operate the countercurrent column with aliphatic (acyclic) olefins having from 2 to 6 carbon atoms per molecule, since chlorides derived from such olefins have been found to undergo substantially no decomposition at temperatures prevailing in the column reboiler.

Suitable diluents for use in this process are selected from normal paraffinic hydrocarbons having boiling points appreciably below those of the product chlorides being synthesized. Normal paraffins are preferable to isoparaffins since the latter might be alkylated. The diluent should boil sufficiently below the product alkyl chloride as to be readily completely separable therefrom in the stripping and reboiling sections. The normal paraffins are completely inert under the conditions prevailing in the operation. Preferably the diluent is condensible at moderate pressure and temperature so as to form reflux liquid for temperature control. Propane is a satisfactory diluent for pressure operations required in the hydrochlorination of ethylene and propylene. n-Butane is a satisfactory diluent for reactions involving propylene and higher olefins while n-pentane is a readily available and suitable diluent in reactions employing butylenes and higher olefins. Selected, close-cut fractions of non-alkylatable natural gasoline may often be used advantageously. The diluent which is used functions both as a diluent and as a reflux liquid for the reaction column.

Operating temperatures are preferably maintained below about 300° F. in order to avoid decomposition of the alkyl chloride products. Ordinarily it is preferred to carry out the hydrochlorination within a temperature range of about 100° F. to about 300° F. The actual selection of a narrow temperature range within the above limits will be dependent on the operating pressure and the particular alkyl chloride involved. Thus, in the preparation of ethyl chloride using propane as a diluent, a suitable pressure is about 200 p. s. i. at which temperature propane boils at about 115° F. which approximately fixes the temperature of the reaction zone. At this pressure, ethyl chloride boils in the vicinity of 250° F., thus fixing the maximum reboiler temperature. On the other hand, in the preparation of amyl chlorides using n-pentane diluent at substantially atmospheric pressure, the reaction zone is maintained at about 96–100° F. with a reboiler temperature of about 220–225° F.

In order to prevent appreciable polymerization of the olefin feed, HCl is fed to the column at such a rate as to give an HCl:olefin mol ratio in excess of 1:1 and preferably at least 2:1 ranging up to 3:1 or even higher.

From the foregoing it will be seen that the present invention provides a novel and unusually advantageous method of carrying out the hydrochlorination of olefins. The equipment requirements are not excessive and the equipment is adapted to long life. The operation is simple and continuous and is easily controlled once the equipment has been brought on-stream. Yields of product based on chemicals are excellent, loss of olefin being kept to a negligible figure. The product is exceptionally pure.

Because of the well recognized thermal lability of alkyl halides, the present invention is limited to products capable of withstanding reboiling at atmospheric pressure without undergoing decomposition. Since prolonged reboiling of those compounds falling within the scope of the invention is deleterious, excessive fractionation is avoided and a stripping gas is supplied to further minimize the need for long heating periods. The present invention further proposes to operate within such temperature limits that no appreciable vaporization of the product alkyl halides occurs. Another advantage is that the present invention effects very rapid removal by fractionation of the product alkyl halides from the reaction zone substantially immediately upon their formation.

A marked advantage of the invention is that undesirable polymerization is prevented by reason of the maintenance of a molar excess of hydrogen chloride over olefin. Another advantage is that temperature control is accomplished in a novel manner by the special use of a selected paraffinic diluent. Presence of unreacted hydrocarbon in the overhead from the reaction section is eliminated since complete reaction of the olefin is attained. The invention involves another advantage in that hydrogen chloride is fed into the stripping section where it functions as a stripping gas and has ample time to become thoroughly distributed throughout the ascending vapors. Injection of the olefin feed at a multiplicity of points spaced in the direction of vapor flow provides for reactant concentrations favorable to hydrohalogenation and preventive of polymerization and at the same time distributes the exothermic heat of reaction evenly throughout the catalyst case. The presence of liquid olefin in the catalyst zone is substantially prevented which further reduces any tendency to olefin polymerization. Numerous other advantages of the present invention will be apparent to those skilled in the art.

While the countercurrent process of the present invention has been described in considerable detail with certain specific illustrations, variations in operating technique will be apparent to those skilled in the art; therefore, said specific illustrations are not to be construed as limiting the scope of the invention.

I claim:

1. In a continuous process for the production of alkyl chlorides by hydrochlorination of aliphatic olefins, the improvement which comprises introducing hydrogen chloride into a vertical stripping zone in a vertical column, passing said hydrogen chloride as vapor upward through said stripping zone and through a vertical reaction zone packed with solid catalyst material and above said stripping zone, introducing an olefin together with an inert diluent at a plurality of vertically spaced points into said reaction zone, reacting said olefin and hydrogen chloride in the presence of said catalyst under conditions of temperature and pressure such that liquid and vapor phases are present at all times, maintaining hydrogen chloride in molar excess over olefin throughout said stripping and reaction zones, passing a liquid comprising alkyl chloride, residual unreacted olefin and inert diluent downward through said reaction and stripping zones, scrubbing the descending liquid with vapors containing excess hydrogen chloride in the manner of fractional distillation, reboiling the liquid attaining the bottom of said stripping zone, withdrawing a kettle product consisting essentially of alkyl chloride, and withdrawing a vaporous overhead consisting essentially of hydrogen chloride and inert diluent from the top of said reaction zone.

2. In a continuous process for the protection of alkyl chlorides by hydrochlorination of aliphatic olefins, the improvement which comprises continuously introducing hydrogen chloride into a vertical stripping zone in a vertical column, passing said hydrogen chloride as vapor upward through said stripping zone and through a vertical reaction zone containing solid catalyst material and superimposed on said stripping zone, continuously introducing an olefin and an inert condensible diluent into said reaction zone, catalytically reacting said olefin and hydrogen chloride in said reaction zone under conditions of temperature and pressure such that liquid and vapor phases are maintained at all times, maintaining a molar excess of hydrogen chloride over olefin throughout said stripping and reaction zones, passing a liquid comprising alkyl chloride, residual unreacted olefin and inert diluent downward through said reaction and stripping zones, scrubbing the descending liquid with vapors containing excess hydrogen chloride in the manner of fractional distillation, reboiling the liquid attaining the bottom of said stripping zone, withdrawing a kettle product consisting essentially of alkyl chloride, withdrawing a vaporous overhead consisting essentially of hydrogen chloride and diluent from the top of said reaction zone, condensing the diluent contained in said overhead vapor, returning the resulting condensate to the top of said reaction zone as reflux, and recycling hydrogen chloride vapor to said stripping zone.

3. The process of claim 2 wherein said hydrogen chloride and said olefin are fed to said column in a mol ratio of HCl to olefin of at least 2:1.

4. The process of claim 2 wherein said reaction zone is maintained within a temperature range of 100° to 300° F.

5. The process of claim 2 wherein said diluent is a normal paraffin hydrocarbon at least as heavy as propane and boiling sufficiently below the product alkyl chloride to be readily and completely separable therefrom in the stripping and reboiling sections of said column.

6. The process of claim 2 wherein said olefin is normal butylene and wherein said diluent is normal pentane.

7. In a process for the catalytic hydrohalogenation of olefinic hydrocarbons in a combination reaction and purification system, the steps of charging an olefinic hydrocarbon of 2 to 6 carbon atoms in admixture with an inert hydrocarbon diluent into the catalyst section of said system, simultaneously charging gaseous hydrogen chloride into a stripping section of said system contiguous to and below said catalyst section, contacting said olefin-containing and HCl streams in said catalyst section to form liquid alkyl chlorides, permitting said alkyl chlorides to flow into said contiguous stripping section countercurrent to said HCl stream, stripping unreacted olefin and hydrocarbon diluent from said alkyl chlorides with the aid of the gaseous HCl stream, further stripping dissolved HCl and hydrocarbon from said alkyl chlorides by means of a reboiler located in said stripping section, continuously withdrawing uncontaminated alkyl chlorides from said reboiler, continuously removing gaseous HCl and hydrocarbon diluent vapors from said catalyst section, condensing said hydrocarbon vapors and returning at least a portion of the condensate to the catalyst section as a means of controlling reaction temperature, and finally recycling effluent HCl to the stripping zone of the reaction system.

WILLIAM NELSON AXE.

REFERENCES CITED

The following references are of record in the file of this patent:

UNITED STATES PATENTS

| Number | Name | Date |
| --- | --- | --- |
| 1,944,839 | Hjerpe et al. | Jan. 23, 1934 |
| 2,204,172 | Balcar | June 11, 1940 |
| 2,366,117 | Leonard | Dec. 26, 1944 |
| 1,985,457 | Nutting et al. | Dec. 25, 1934 |
| 2,099,480 | Hjerpe et al. | Nov. 16, 1937 |
| 2,330,754 | Skelton et al. | Sept. 28, 1943 |
| 2,387,541 | Sweeney | Jan. 1, 1942 |

Certificate of Correction

Patent No. 2,434,094. January 6, 1948.

WILLIAM NELSON AXE

It is hereby certified that error appears in the printed specification of the above numbered patent requiring correction as follows: Column 7, line 56, for the word "protection" read *production*; and that the said Letters Patent should be read with this correction therein that the same may conform to the record of the case in the Patent Office.

Signed and sealed this 13th day of April, A. D. 1948.

[SEAL]

THOMAS F. MURPHY,
*Assistant Commissioner of Patents.*